(12) United States Patent
Rundle

(10) Patent No.: US 10,781,940 B2
(45) Date of Patent: Sep. 22, 2020

(54) ASSEMBLY AND METHODS FOR COUPLING SECTIONS OF CONDUIT

(71) Applicant: Lance Rundle, Hotchkiss, CO (US)

(72) Inventor: Lance Rundle, Hotchkiss, CO (US)

( * ) Notice: Subject to any disclaimer, the term of this patent is extended or adjusted under 35 U.S.C. 154(b) by 109 days.

(21) Appl. No.: 16/165,152

(22) Filed: Oct. 19, 2018

(65) Prior Publication Data
US 2019/0120406 A1 Apr. 25, 2019

Related U.S. Application Data

(60) Provisional application No. 62/575,103, filed on Oct. 20, 2017.

(51) Int. Cl.
| | |
|---|---|
| *F16L 1/036* | (2006.01) |
| *F16L 47/00* | (2006.01) |
| *F16L 19/06* | (2006.01) |
| *F16L 3/015* | (2006.01) |
| *F16L 1/09* | (2006.01) |
| *F16L 1/10* | (2006.01) |
| *E02F 5/10* | (2006.01) |

(52) U.S. Cl.
CPC .............. *F16L 1/036* (2013.01); *E02F 5/10* (2013.01); *F16L 1/09* (2013.01); *F16L 1/10* (2013.01); *F16L 3/015* (2013.01); *F16L 19/06* (2013.01); *F16L 47/00* (2013.01)

(58) Field of Classification Search
CPC . B25B 27/02; B25B 27/16; F16L 1/09; Y10T 29/5367; Y10T 29/53678; Y10T 29/5383
See application file for complete search history.

(56) References Cited

U.S. PATENT DOCUMENTS

| | | | | |
|---|---|---|---|---|
| 3,207,326 A | * | 9/1965 | Enix ................... | F16L 1/09 29/237 |
| 3,561,615 A | * | 2/1971 | Forsberg ............. | F16L 1/09 29/237 |
| 3,639,967 A | * | 2/1972 | Brighton ............. | F16L 1/09 29/237 |
| 3,727,653 A | * | 4/1973 | Tucek ................. | A01G 23/089 144/34.5 |
| 5,795,101 A | * | 8/1998 | Bill .................... | B66C 1/427 294/81.4 |
| 5,918,923 A | * | 7/1999 | Killion ............... | B66C 1/427 294/115 |
| 6,280,119 B1 | * | 8/2001 | Ryan .................. | B66C 1/425 294/104 |
| 9,073,732 B2 | * | 7/2015 | LaValley ............ | B66C 1/44 |
| 9,415,542 B2 | * | 8/2016 | Montgomery ...... | B29C 65/7802 |
| 2005/0117973 A1 | * | 6/2005 | Nelson ............... | F16L 1/065 405/184.5 |

* cited by examiner

*Primary Examiner* — Tyrone V Hall, Jr.
(74) *Attorney, Agent, or Firm* — FisherBroyles LLP; Ian R. Walsworth

(57) ABSTRACT

A system and method for coupling sections of pipe is disclosed, wherein the system preferably comprises a frame, a carriage and a controller. In embodiments, the frame comprises a pipe frame, which preferably extends substantially the entire length of the system and may be secured via a chain. The system in a preferred embodiment may be secured to a piece of machinery, such as an excavator bucket, back hoe or equivalent machinery for moving a first section of pipe to a location where a second section of pipe resides for coupling the first and second sections of pipe. Methods of use are also disclosed herein.

15 Claims, 7 Drawing Sheets

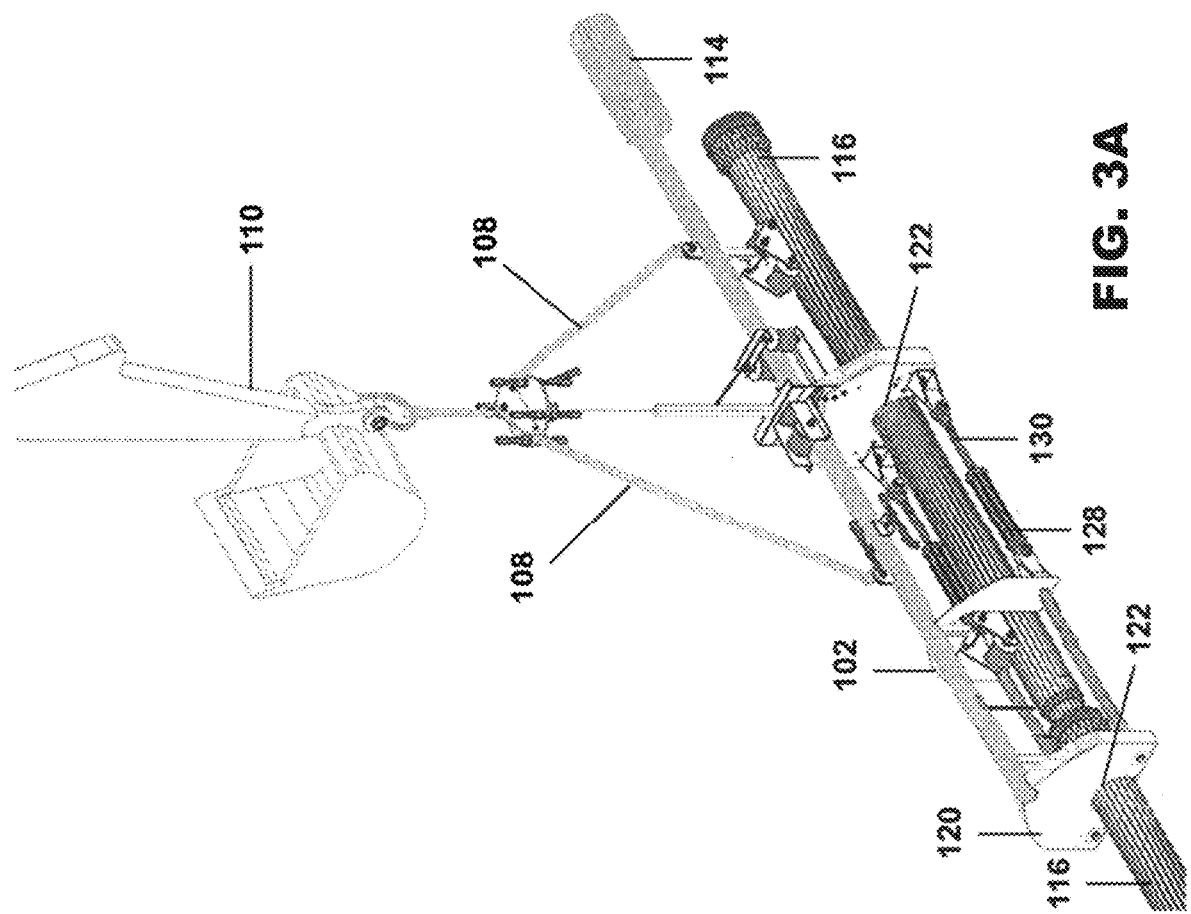

ASSEMBLY AND METHODS FOR COUPLING SECTIONS OF CONDUIT

CROSS-REFERENCE TO RELATED APPLICATION

This application claims priority to and the benefit under 35 U.S.C. § 119(e) to U.S. Provisional Patent Application Ser. No. 62/575,103 filed Oct. 20, 2017, which is incorporated by reference in its entirety.

FIELD OF THE INVENTION

The field of the invention relates to pressurized conduit to systems, methods and apparatus for installing and coupling sections of pressurized conduit, including pipe, via an automated or semi-automated process, and related equipment.

BACKGROUND OF THE INVENTION

Pressurized conduit, such as piping used for the transportation of municipal water and wastewater, is almost universally found in all inhabited areas across the country. Municipal water and wastewater piping generally facilitate the transfer of materials to and from commercial and residential structures. Despite its adoption and use, municipal water and wastewater piping is still generally installed and connected through antiquated procedures involving substantial manual labor.

In practice, municipal water and wastewater conduit sections are typically coupled together by principally manual processes. These prior art systems and methods are time-consuming, often result in an incomplete or incorrect coupling, are difficult to accomplish in poor weather conditions, and are generally inefficient. Automated and semi-automated process for coupling pipe have been attempted, but suffer from numerous shortcomings.

The present invention solves the problems associated with the prior art and provides an assembly and methods for coupling piping together through fully or semi-automated processes that allows for faster, more accurate and safer installation. Other advantages and benefits will become apparent after reviewing the Summary and Detailed Description sections below.

SUMMARY

Accordingly, one object of the present disclosure is to provide a conduit coupling assembly and system to correct the deficiencies and other shortcomings of present coupling assemblies, systems and methods. In one embodiment of the present disclosure, the invention comprises an automated or semi-automated system where sections of pressurized conduit (such as, by way of example but not limitation, C900 PVC pipe or equivalent conduit, which may range from 8-48" in diameter) may be coupled together with greater accuracy and efficiency than previously achieved.

In a preferred embodiment, the assembly and system comprises a frame, a carriage and a controller. In one embodiment, the controller comprises a joystick or equivalent operational device for controlling various components of the assembly and system. In embodiments, the frame comprises a section referred to herein as the pipe frame, which preferably extends a substantial length of the assembly, and which is secured to the assembly at or near the mid-point of the pipe frame. The pipe frame may also be secured via a chain, which may also be secured to a piece of machinery, such as an excavator bucket, back hoe or equivalent machinery. In embodiments, one assembly further comprises of a counterweight.

In a preferred embodiment, the pipe frame is connected to the carriage, which may also comprise one or more "dead man," with one dead man preferably located on the end of the pipe frame (opposite from the counterweight), and one that is located substantially in a central portion of the pipe frame. Both dead men may be generally triangular shaped and contain a substantially semi-circular cutout where sections of conduit (for instance, the bell section of a pipe) may reside or come to rest during coupling sections of conduit. In this manner, the dead men may serve as guides to align the different sections of pipe to be joined, apply pressure to the bell section of the adjoining pipe, and otherwise prevent misalignment cause by the weight of a free end of any one conduit section, resulting in the conduit pivoting or tilting and causing problems while attempting to join the conduit with another section of conduit.

The dead man at the mid-point of the pipe frame preferably comprises a hydraulic or equivalent pipe clamp(s) used to grasp and secure sections of pipe and permit a user to relocate sections of pipe from a first location to a second or final location. The pipe clamp(s) may be oriented to permit grasping of different widths of pipe (preferably from 8-48" diameter) and may also comprise feet, with or without pads, to facilitate the gripping of pipe when inserted substantially inside the semi-circular cutout section of the dead man and generally above the pipe clamp(s). In embodiments, the clamp(s) may be manipulated via the controller.

In embodiments described herein, certain components of the assembly may be manipulated by the controller by way of electrical, electrical-mechanical and/or hydraulic means. In a preferred embodiment, the pipe clamp(s) may be controlled via a controller, which can operate the pipe clamp via hydraulic rams connected to the carriage or alternately to the dead man. In operation, sections of pipe can be secured by the pipe clamp and then moved into an optimal position (along with the pipe frame) to be coupled with other sections of pipe. For example, this assembly permits a user to gain purchase on a single piece of pipe laying adjacent to or within a trench and then move that section of pipe to a second section of pipe, where the process of coupling may be achieved using the assembly as described below.

In a preferred embodiment, the assembly also comprises a chassis that further comprises two hydraulic pistons that can move back and forth. In one embodiment, this movement results in the coupling of the two or more sections of conduit (vis-a-vis the spigot end being inserted into the bell end of the piston, or visa-versa). The hydraulic pistons are preferably controlled via the plurality of hydraulic lines that are connected to the controller and supplied with hydraulic fluid, as will be appreciated by one of ordinary skill in the art. The chassis may move laterally and relative to a stationary section of pipe to cause a first section of pipe to translate relative to the stationary section of pipe and cause the two sections of pipe to be coupled together. In one embodiment, the second section of pipe may be stationary due to it being secured to the assembly, for example, by a second pair of pipe clamps associated with the second dead man. Alternately, the pipe may be stationary relative to the first section of pipe by virtue of being secured to a previously coupled section of pipe, which may be buried in certain applications or excavated in others. The combined weight of the pipe sections in conjunction with the pressure applied by the dead man on the bell section of the adjoining pipe causes the previously coupled pipe sections to remain stationary while the first section of pipe is allowed to translate via the moveable chassis. This assembly provides a more efficient method of coupling sections of pipe and further provides a heretofore unresolved solution to the problems with prior art systems and methods for coupling pipe. This assembly also provides greater range of motion and torque than prior art manual processes discussed above.

In one embodiment, a method of assembling two or more sections of pipe is disclosed. In one embodiment, the method includes the steps of (1) selecting a pipe to join with at least one other pipe, (2) positioning a carriage above the selected pipe, (3) grasping the pipe with clamps provided with the carriage, (4) lifting the selected pipe with the carriage, (5) relocating the pipe to a desired position, (6) positioning at least one dead man against the bell section of the at least one other pipe, (7) moving the selected pipe using the carriage and relative to the at least one other pipe to join the pipes together, and (8) releasing the selected pipe from the carriage and the clamps.

One having skill in the art will appreciate that embodiments of the present disclosure may be constructed of materials known to provide or predictably manufactured to provide the various aspects of the present disclosure. These materials may include, for example, steel, steel alloy, stainless steel, iron, cast iron, aluminum, aluminum alloy, chromium alloy, and other metals or metal alloys. These materials of other components may be comprised of, for example, polyvinyl chloride, ABS plastic, polyurethane, polyethylene resins, particularly fiber-encased resinous materials rubber, latex, synthetic rubber, synthetic materials, polymers, and natural or environmentally beneficial materials.

The Summary is neither intended nor should it be construed as being representative of the full extent and scope of the present disclosure. The present disclosure is set forth in various levels of detail in the Summary, as well as in the attached drawings and the Detailed Description, and no limitation as to the scope of the present disclosure is intended by either the inclusion or non-inclusion of elements, components, etc. in this Summary. Additional aspects of the present disclosure will become more readily apparent from the Detailed Description, particularly when taken together with the drawings.

The above-described benefits, embodiments, and/or characterizations are not necessarily complete or exhaustive, and in particular, as to the patentable subject matter disclosed herein. Other benefits, embodiments, and/or characterizations of the present disclosure are possible utilizing, alone or in combination, as set forth above and/or described in the accompanying figures and/or in the description herein below. Further details and other features will become apparent after review of the following Detailed Description and accompanying drawing figures.

BRIEF DESCRIPTION OF THE DRAWINGS

Those of skill in the art will recognize that the following description is merely illustrative of the principles of the disclosure, which may be applied in various ways to provide many different alternative embodiments. This description is made for illustrating the general principles of the teachings of this disclosure invention and is not meant to limit the inventive concepts disclosed herein.

The accompanying drawings, which are incorporated in and constitute a part of the specification, illustrate embodiments of the disclosure and together with the general description of the disclosure given above and the detailed description of the drawings given below, serve to explain the principles of the disclosure.

In the drawings:

FIG. 1 is a perspective view of the system and assembly in to a preferred embodiment;

FIG. 2A is a side elevation view of the system and assembly shown in FIG. 1;

FIG. 2B is a sectional view of components of the system and assembly shown in FIG. 1;

FIG. 3A is a perspective view showing the system and shown in FIG. 1 attached to an excavator bucket;

FIG. 3B is a profile view of the system and assembly shown in FIG. 3A;

FIG. 4 is an exploded perspective view of the system and assembly shown in FIG. 1; and FIG. 5 shows the steps of a method of assembling two or more sections of conduit according to embodiments of the present disclosure.

Figure 1:
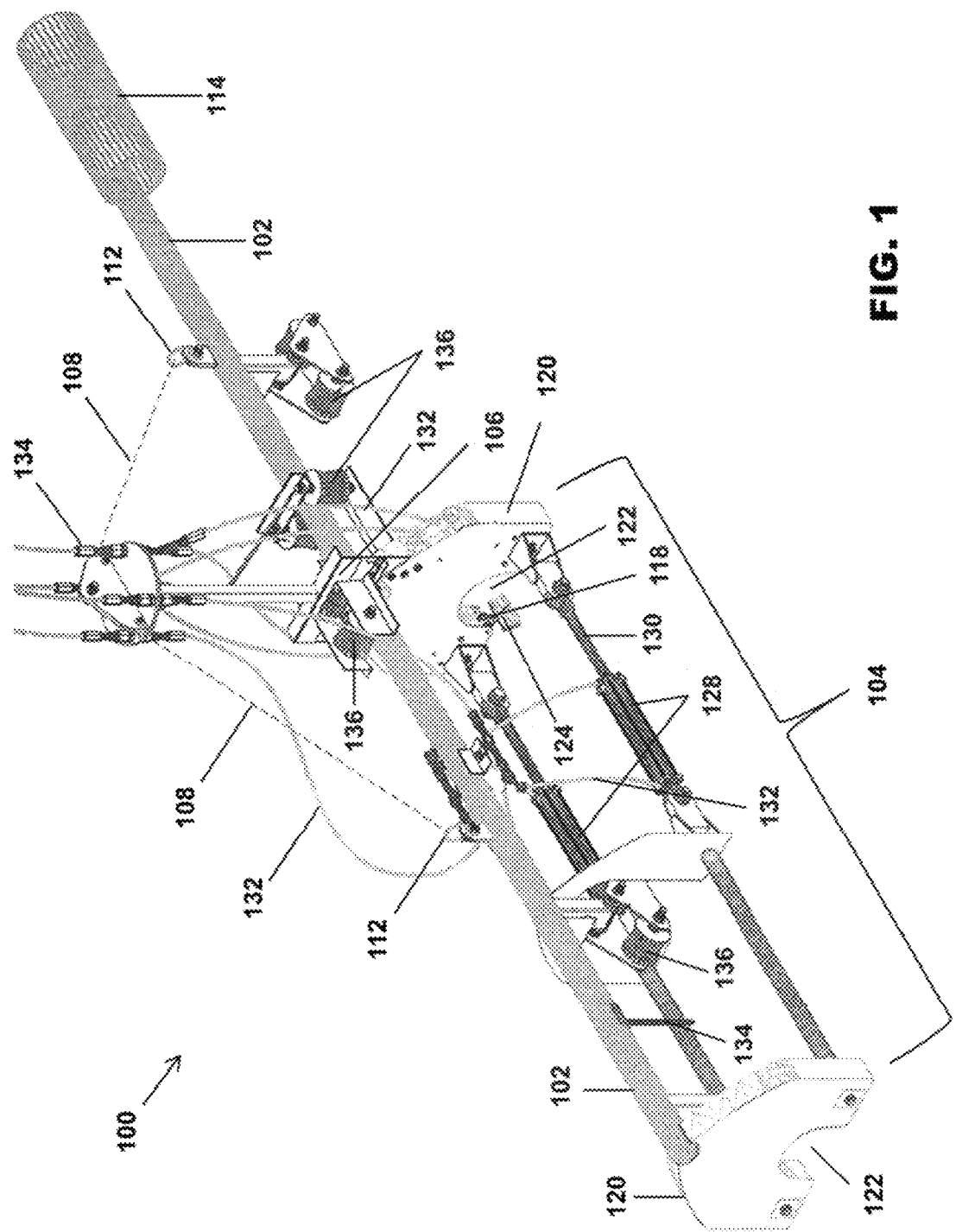

It should be understood that the drawings are not necessarily to scale. In certain instances, details that are not necessary for an understanding of the disclosure or that render other details difficult to perceive may have been omitted. It should be understood, of course, that the disclosure is not necessarily limited to the particular embodiments illustrated herein.

DETAILED DESCRIPTION

The present invention provides its benefits across a broad spectrum of endeavors. It is applicant's intent that this specification and the claims appended hereto be accorded a breadth in keeping with the scope and spirit of the invention being disclosed despite what might appear to be limiting language imposed by the requirements of referring to the specific examples disclosed. Thus, to acquaint persons skilled in the pertinent arts most closely related to the present invention, a preferred embodiment of the system is disclosed for the purpose of illustrating the nature of the invention. The exemplary method of installing, assembling and operating the system is described in detail according to the preferred embodiment, without attempting to describe all of the various forms and modifications in which the invention might be embodied. As such, the embodiments described herein are illustrative, and as will become apparent to those skilled in the art, can be modified in numerous ways within the scope and spirit of the invention, the invention being measured by the appended claims and not by the details of the specification.

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, subparagraph (f).

Figure 2A:
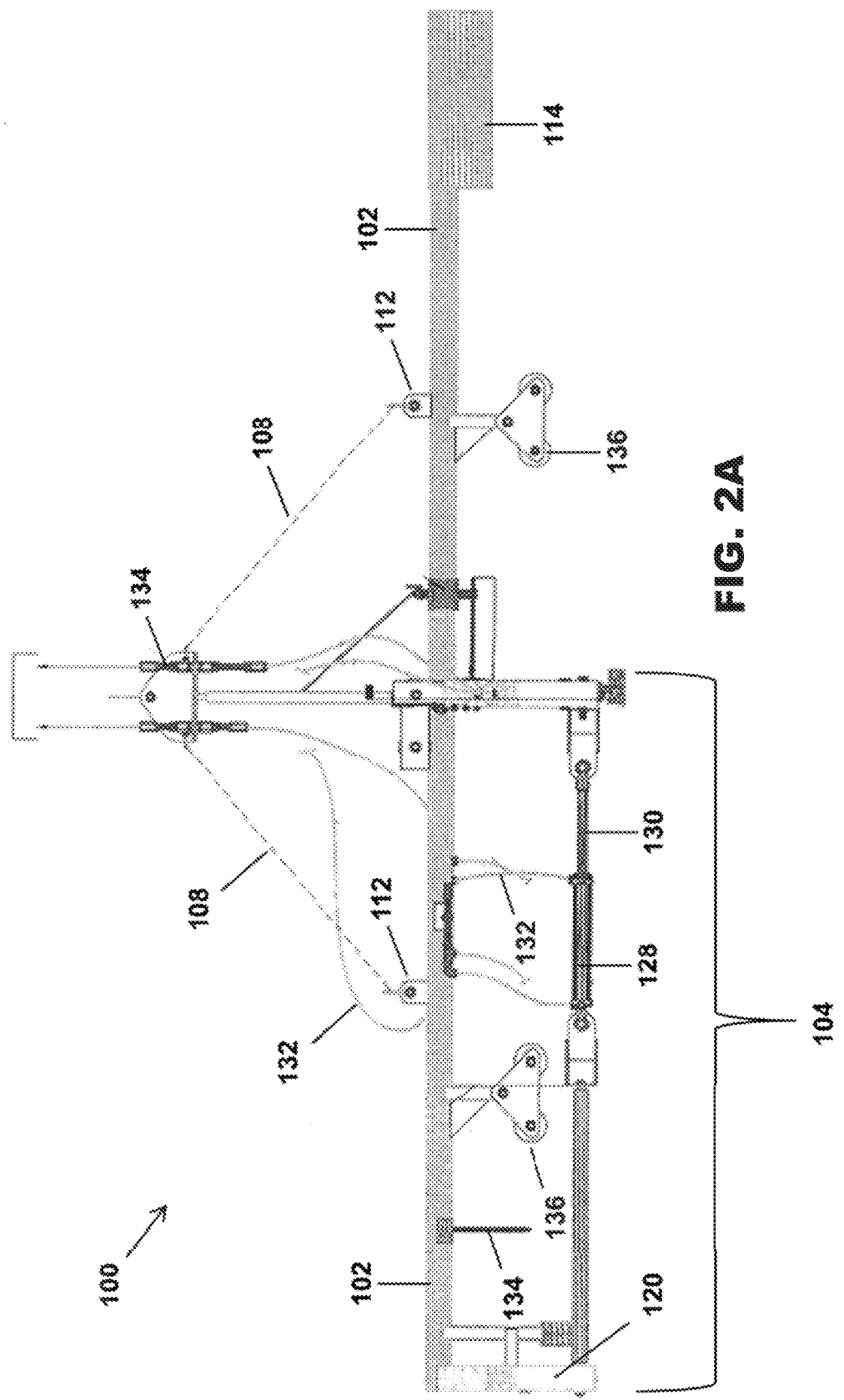
Figure 3B:
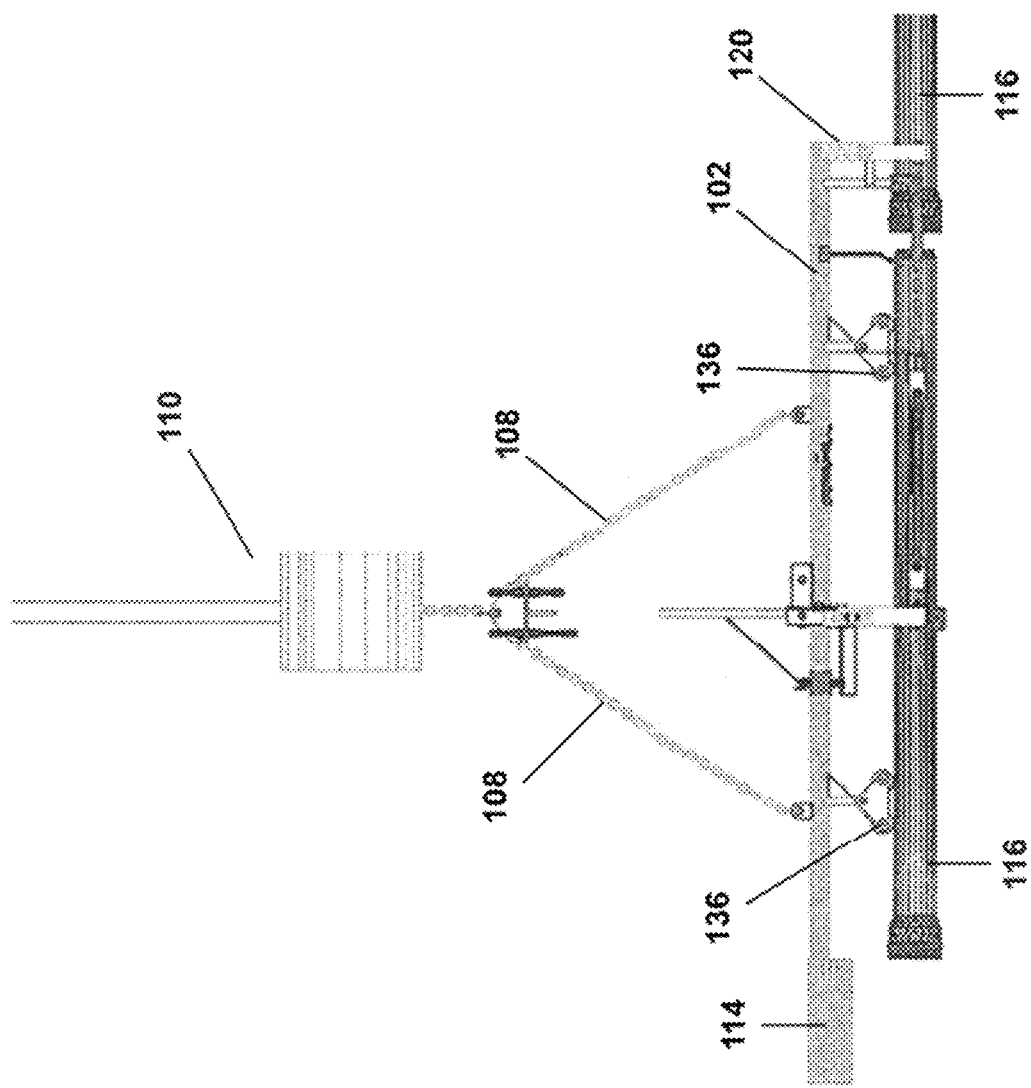
Figure 4:
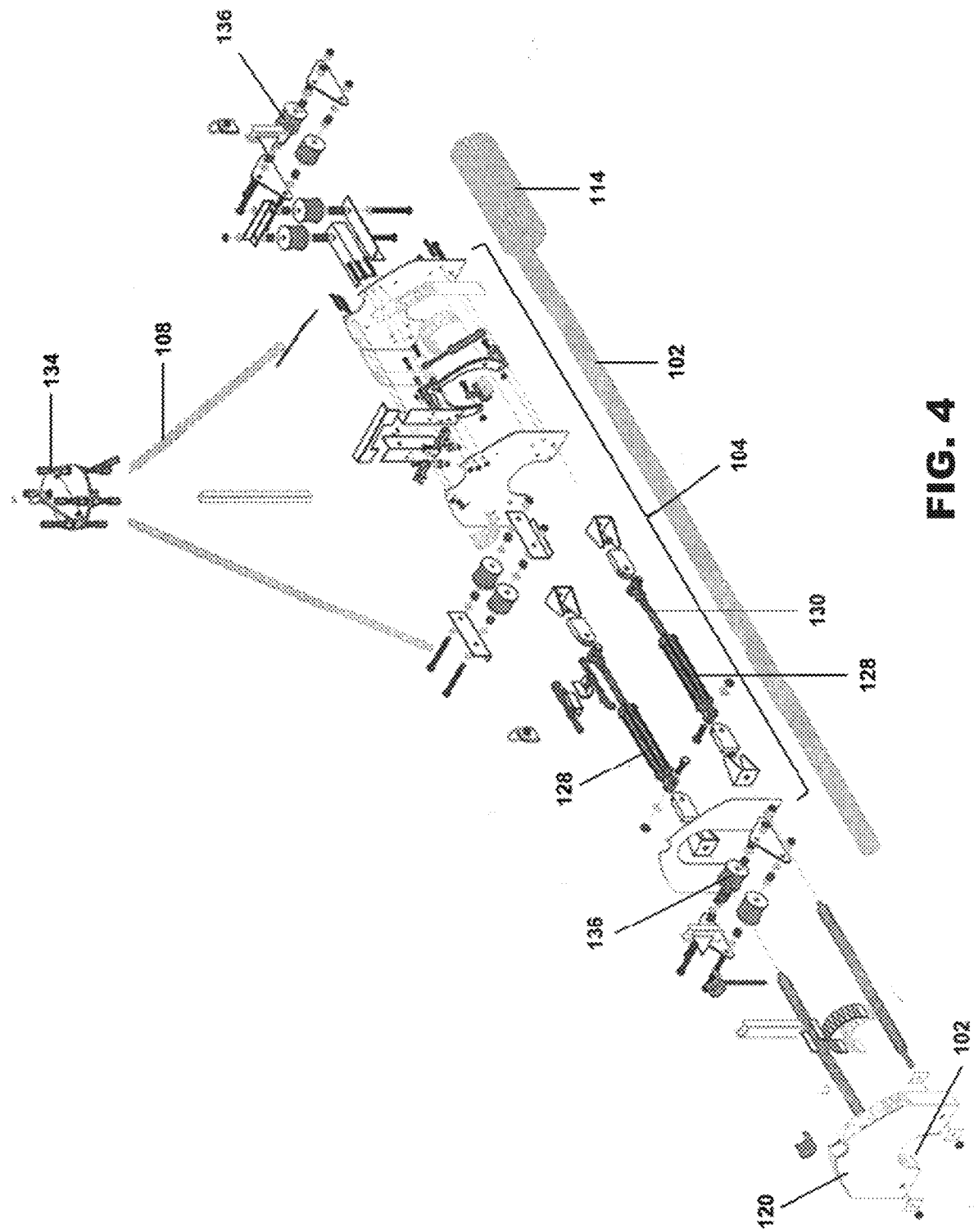

FIG. 1 depicts an embodiment of an assembly and system 100 according to a preferred embodiment, which comprises a pipe frame 102 (comprising various sub-components described herein), a carriage 104 (also having associated sub-components) and a controller (not shown in FIG. 1 preferably in communication with one or more of the components or sub-components described herein). In a preferred embodiment, the frame pipe frame 102 extends substantially the entire length of the system 100 and secured at the mid-point 106 of the pipe frame 102. The pipe frame 102 may also be secured via a chain(s) 108, also depicted in FIGS. 3A and 3B, which may be secured to piece of machinery 110, such as an excavator bucket, back hoe or equivalent machinery (not shown in FIG. 1). The chain 108 may be secured to the frame 102 via brackets 112 with, for example, clevis hooks as depicted in FIGS. 1 and 2A.

In a preferred embodiment, the pipe frame 102 is secured to a counterweight 114 on one end of the system 100, which is used to offset the weight of the pipe sections 116 when they are engaged with the pipe clamp(s) 118. The pipe frame 102 preferably coupled to a carriage 104, which in a preferred embodiment is comprised of one or more dead man 120. In a most preferred embodiment, the assembly comprises two dead men 120, one that is located on the end of the pipe frame 102 (opposite from the counterweight) and one that is located substantially in the central portion of the pipe frame 102. Both dead men 120 may be generally triangular shaped and contain a substantially semi-circular cutout 122 where pipe sections 116 or other conduit may reside during coupling.

In some embodiments, the assembly 100 further comprises adjustable legs (not shown), preferably positioned on either lateral side of the frame 102, and which may be adjusted to accommodate a variety of heights above a ground surface. The adjustable legs serve to stabilize the assembly to prevent tipping or pivoting while in use, and may be independently adjustable to accommodate for uneven surfaces where a section of pipe 116 may be secured to the assembly or positioned in a final location. The adjustable legs preferably comprise pads of sufficient size to prevent the legs from sinking into a ground surface, which may be saturated or not fully compacted due to recent excavation.

In some preferred embodiments, the system 100 comprises a modified dead man 120 in which the connecting bracket between the dead man 120 and the pipe frame 102 positioned above has been removed. This embodiment provides greater access to the area surrounding the dead man 120 and avoids the bracket obscuring the operator's vision of the pipe 116 relative to the dead man 120 and/or pointer 134. Variations on the size and shape of the dead man 120 are contemplated for purposes of the present disclosure.

Figure 2B:
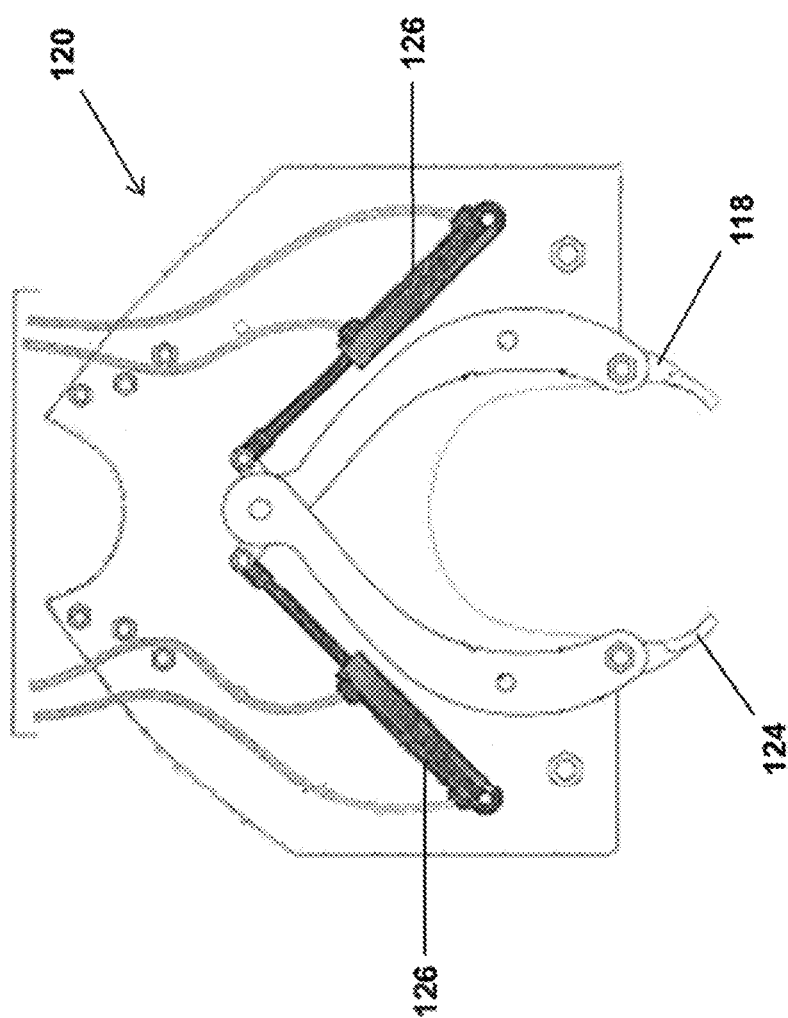

In embodiments, the dead man 120 at the mid-point 106 of the pipe frame 102 preferably comprises one or more hydraulic pipe clamp(s) 118, as shown in FIG. 2B, that are used to grasp and secure sections of pipe 116. The pipe clamp(s) 118 may also comprise feet with pads 124 to facilitate the gripping of pipe 116 when inserted substantially inside the pipe clamp(s) 118. The pipe clamp(s) 118 is preferably controlled via a controller, which can operate the pipe clamp(s) 118 via hydraulic rams 126. In one embodiment, the controller comprises a joystick or equivalent device that can be used to directionally control the pipe frame 102 and operate the hydraulic components described herein. In other embodiments, the controller may be software-based and operable on a specific piece of computational machinery, including but not limited to a tablet, laptop computer, mobile device, personal desktop accessory or other specialized computational machinery.

As shown in FIGS. 1 and 2A, the carriage 104 preferably comprises a chassis 128 that further comprises a plurality of hydraulic pistons 130 that can move back and forth (i.e., via the spigot end being inserted into the bell end of each respective piston). The hydraulic pistons 130 are preferably controlled via the plurality of hydraulic lines 132 that are connected to the controller. The plurality of hydraulic lines 132 are preferably connected to the controller, and may further connect to the quick-connect ports 134 on an excavator 110 or equivalent piece of equipment or machinery so that a user may control and position the assembly 100 as needed.

In a preferred embodiment, the carriage 104 comprises two hydraulic pistons 130 that run substantially parallel to each other and that work in tandem to move a section of pipe 116 into the optimal position to be coupled with another section of pipe 116 once the section of pipe 116 is secured to the assembly via the pipe clamp(s) 124. When the hydraulic pistons 130 are in a first or protracted position (position A), the dead man 120 in the middle section is located generally at the mid-point 106 of the pipe frame 102. When the hydraulic pistons 130 are in a second or retracted position (position B), the dead man 120 in the middle section moves towards a pointer 134 that is secured to the pipe frame 102, which enables the pipe section 116 secured via the pipe clamp(s) 124 to be inserted into an adjoining pipe section 116. The adjacent pipe section 116 is preferably positioned in or adjacent the semi-circle cut-out 122 of the dead man 120 at the end of the pipe frame 102. The carriage 104 may also comprise a plurality of neoprene rollers 136 that align and guide a section of pipe 116 during coupling, as described in FIGS. 1 and 2A. In embodiments, the rollers 136 are adjustable to accommodate different sizes of conduit.

In operation, sections of pipe 116 can be secured by the pipe clamp(s) 124 and then moved into an optimal position to be coupled with other sections of pipe 116. Once a section of pipe 116 has been successfully coupled to another section of pipe 116, the pipe clamp(s) 124 can be disengaged from the pipe 116, such as by operating the controller as needed by the user. Pipe clamp(s) 124 are adjustable and can be used to secure and move a variety of pipe 116 diameters.

The pointer 134 referenced above is preferably secured to the pipe frame 102, and serves to identify the optimal point where coupling should occur. In other words, the pointer 134 specifies how far the pipe section 116 must be moved via the hydraulic pistons 130 in order to be successfully secured to the adjoining section of pipe 116. The location of the pointer 134 is adjustable and can be manually manipulated by the user as needed. In a preferred embodiment, the pointer 134 may also contain a camera (not shown) which allows the user to remotely view the coupling process to verify that the coupling is performed correctly.

In yet another embodiment, the pointer 134 may be positioned on a track that allows adjustment via the controller, depending on the type of pipe 116 being coupled or the desired overlap sections or adjoining pipe 116. In embodiments, the camera may be positioned such that the location of the pointer 134 relative to the sections of pipe 116 may be easily discerned by the operator, who may be located several yards away from the location of the pointer 134. In other embodiments, audio controls are provided at or near the location of the pointer 134 enabling the operator to engage in two-way communication with another person in the vicinity of the pointer.

Figure 5:
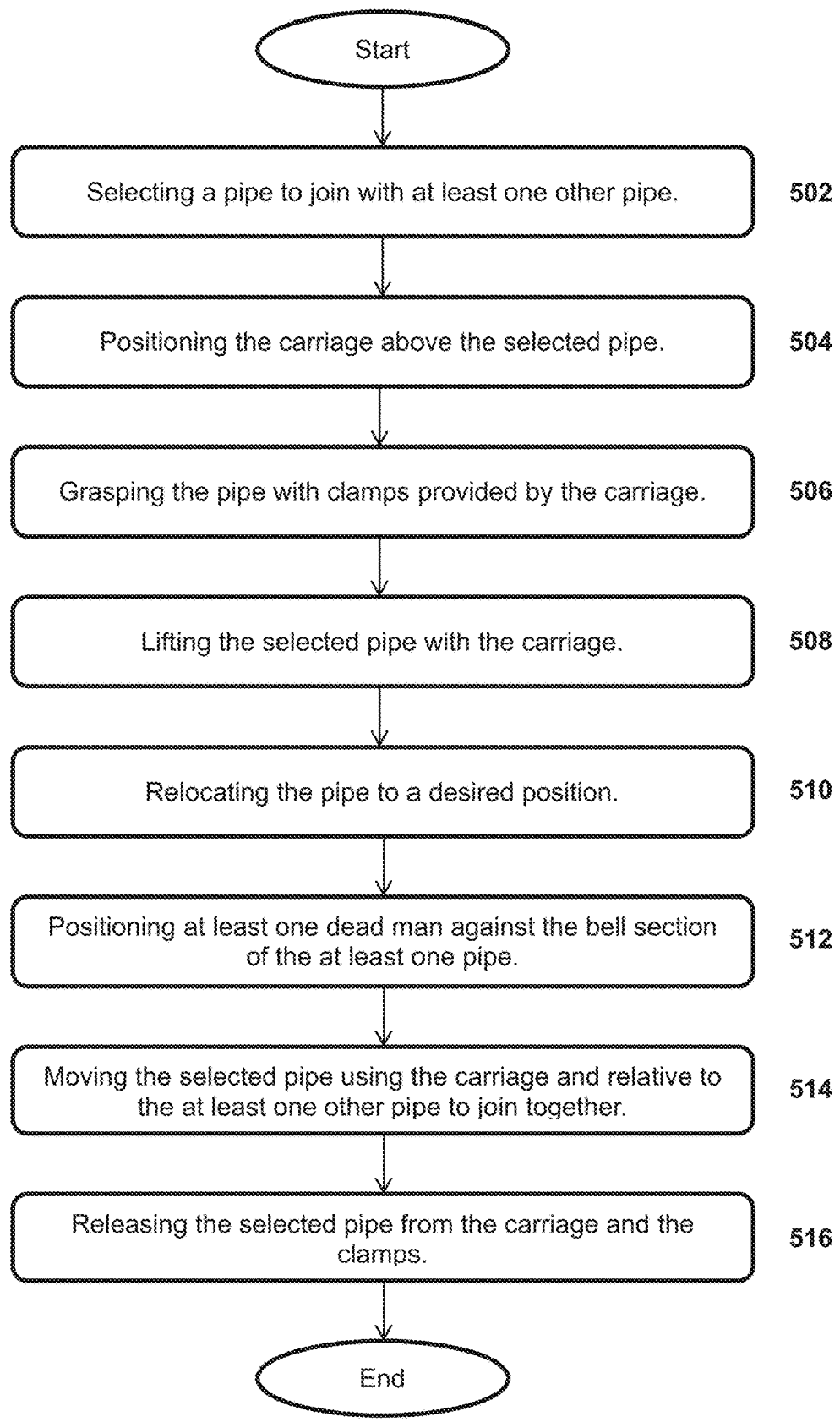

In one embodiment, as depicted in FIG. 5, a method of assembling two or more sections of pipe includes one or several of the following steps: (1) selecting a pipe to join with at least one other pipe 502; (2) positioning the carriage above the selected pipe 504; (3) grasping the pipe with clamps provided with the carriage 506; (4) lifting the selected pipe with the carriage 508; (5) relocating the pipe to a desired position 510; (6) positioning at least one dead man against the bell section of the at least one other pipe 512; (7) moving the selected pipe using the carriage and relative to the at least one other pipe to join the pipes together 514; and (8) releasing the selected pipe from the carriage and the clamps 516.

The method of using the apparatus described above to join two or more sections of pipe may further comprise the steps of securing the apparatus to a machine, such as an excavator bucket. The user may then direct the apparatus, preferably via a plurality of hydraulic lines, to secure a section of pipe, which is located, for example, on the ground. Next, the section of pipe may then be secured by the apparatus via a hydraulically controlled pair of pipe clamp(s), preferably comprising feet and pads. Next, the section of pipe is then maneuvered generally adjacent to a second section of pipe, which is located, for example, in a pre-excavated trench. The apparatus with the secured pipe section is then lowered into the trench, preferably with a plurality of hydraulic pistons associated with the apparatus being in a first or protracted position (position A). The apparatus is then placed into the trench, wherein the dead man at the end of the pipe frame is placed generally above the second section of pipe (for example, against the bell end of the second pipe) so that the generally semi-circular cutout in the dead man secures the second piece of adjoining pipe section and provides leverage for movement of the apparatus relative to the second pipe. Next, the pipe section secured by the hydraulic pipe clamp(s) is then moved toward a pointer via the hydraulic pistons towards a second or retracted position (position B) until the end of the pipe section in the pipe clamp(s) is generally aligned with the pointer. At this point, the sections of pipe are substantially aligned and located in the optimal position to be successfully coupled together. Next, the user may disengage the pipe clamp(s) from the section of pipe via the hydraulic lines.

The method steps outlined above may be repeated to join additional sections of pipe. This method for assembling pipe sections together, as described above, insures that pipe sections can be coupled together in an efficient, safe and accurate manner and may be repeated regardless of the material, weight, size, diameter, material or location of the pipe or other conduit.

While various embodiments of the present disclosure have been described in detail, it is apparent that modifications and alterations of those embodiments will occur to those skilled in the art. However, it is to be expressly understood that such modifications and alterations are within the scope and spirit of the present disclosure, as set forth in the following claims.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the disclosure.

Moreover, though the present disclosure has included description of one or more embodiments and certain variations and modifications, other variations and modifications are within the scope of the disclosure, e.g. the use of a certain component described above alone or in conjunction with other components may comprise a system, while in other aspects the system may be the combination of all of the components described herein, and in different order than that employed for the purpose of communicating the novel aspects of the present disclosure. Other variations and modifications may be within the skill and knowledge of those in the art, after understanding the present disclosure. This method of disclosure is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A pipe press assembly, comprising:
a frame,
a carriage,
a controller;
the carriage comprising at least one clamp that is hydraulically controlled by the controller;
the carriage further comprising a chassis, which further comprises a plurality of hydraulic pistons that are positioned to move the chassis relative to the frame from at least a first position to a second position;
wherein the hydraulic pistons are configured to translate the chassis work in unison to couple sections of pipe together, and wherein the controller hydraulically controls the carriage that enables sections of pipe to be coupled together; and
wherein the frame further comprises a dead man and at least one counterweight located on opposite ends.

2. The assembly of claim 1 wherein the frame is mechanically coupled and secured to the carriage at a central portion of the assembly.

3. The assembly of claim 1 wherein the frame is secured to the carriage via at least one chain, which may also be secured to a piece of machinery.

4. The assembly of claim 3 wherein the at least one chain is secured to the frame via brackets with clevis hooks.

5. The assembly of claim 1 wherein the dead man is generally triangular shaped and comprises a substantially semi-circular cutout where pipe sections may reside during coupling.

6. The assembly of claim 5 further comprising a second dead man located generally at the mid-point of the pipe frame.

7. The assembly of claim 6 wherein the second dead man comprises a plurality of hydraulic pipe clamps that are used to grasp and secure the sections of pipe.

8. The assembly of claim 7 wherein the plurality of hydraulic pipe clamps comprise a plurality of feet to facilitate the gripping of the sections of pipe.

9. The assembly of claim 7 wherein the plurality of hydraulic pipe clamps are controlled via the controller which operates the plurality of hydraulic pipe clamps via a plurality of hydraulic rams.

10. The assembly of claim 1 wherein the controller comprises at least one joystick which directionally controls the frame.

11. The assembly of claim 1 wherein the controller is operable via computational machinery.

12. A pipe press assembly, comprising:
a frame:
a carriage;
a controller:
the carriage comprising at least one clamp that is hydraulically controlled by the controller;
the carriage further comprising a chassis, which further comprises a plurality of hydraulic pistons that are positioned to move the chassis relative to the frame from at least a first position to a second position;
wherein the hydraulic pistons are configured to translate the chassis work in unison to couple sections of pipe together, and wherein the controller hydraulically controls the carriage that enables sections of pipe to be coupled together; and
wherein the assembly further comprises at least one pointer which identifies the desired location of a second pipe section coupled to a first pipe section.

13. The assembly of claim 12 wherein the at least one pointer is mechanically coupled and secured to the frame, and wherein the location of the at least one pointer is adjustable and can be manually manipulated as needed by a user.

14. The assembly of claim 12 wherein the at least one pointer comprises at least one camera which allows the user to remotely view the coupling process to verify that the coupling is performed correctly.

15. An inline hydraulic pipe press system, comprising:
a frame;
a carriage;
a controller;
the frame comprising a pointer which identifies the desired location of a second pipe section coupled to a first pipe section;
the carriage comprising at least one clamp that is hydraulically controlled by the controller;
the carriage further comprising a chassis, which further comprises a plurality of hydraulic pistons that are positioned to move the chassis relative to the frame from at least a first position to a second position;
wherein the hydraulic pistons work in unison to couple sections of pipe together, and wherein the controller hydraulically controls the carriage that enables sections of pipe to be coupled together.

* * * * *